United States Patent [19]

Hatch

[11] Patent Number: 4,824,188

[45] Date of Patent: Apr. 25, 1989

[54] MODULATION ARRANGEMENT FOR ANTI-LOCK BRAKE SYSTEM

[75] Inventor: Frank E. Hatch, Los Angeles, Calif.

[73] Assignee: Hughes Aircraft Company, Los Angeles, Calif.

[21] Appl. No.: 146,635

[22] Filed: Jan. 21, 1988

[51] Int. Cl.$^4$ ............................................. B60T 8/40
[52] U.S. Cl. .................................... 303/116; 303/113
[58] Field of Search ................ 188/181 A; 303/100, 303/103, 110, 111, 113, 115, 116, 119

[56] References Cited

U.S. PATENT DOCUMENTS

| | | | |
|---|---|---|---|
| 4,421,361 | 12/1983 | Arikawa et al. | 303/116 |
| 4,462,642 | 7/1984 | Leiber | 303/116 X |
| 4,511,971 | 4/1985 | Dittner et al. | 364/426 |
| 4,555,145 | 11/1985 | Maehara et al. | 303/116 X |

OTHER PUBLICATIONS

Hudraulic Brake Actuation Systems under Consideration of Antilock Systems and Disk Brakes, (O. Depenheuer and H. Strien) May, 1973.
A New Anti-Skid-Brake System for Disc and Drum Brakes (H. Schurr and A. Dittner), Feb. 1984.

*Primary Examiner*—Duane A. Reger
*Attorney, Agent, or Firm*—William J. Streeter; A. W. Karambelas

[57] ABSTRACT

A brake fluid pressure modulator (108) for an anti-lock braking system (ABS) (100) employs a combined isolation valve/displacement cylinder (130) to effect modulation of brake fluid pressure being delivered to a vehicle's wheel brakes (110F, 110R, 111F, 111R). A control valve assembly (140) reduces and reapplies brake fluid pressure by controlling flow of hydraulic fluid to a stepped piston (1315, 1317) in the displacement cylinder to move the piston against a biasing element (1321) such as a coil die spring. Piston movement against the spring closes an isolation check valve (1307, 1309) to prevent further brake fluid from the vehicle's master cylinder from being delivered to the wheel brakes. The cylinder cavity (1312) resulting from piston movement enables brake fluid to drain from the wheel brake back into the displacement cylinder. Reapplication of brake fluid is effected by allowing flow of hydraulic fluid out of the cylinder with the biasing spring moving the piston back to its idle position, thereby forcing brake fluid back to the wheel brake. The control valve assembly is electrically driven by a control computer (120) which also monitors vehicle wheel speed and cap-off brake pressure via appropriate transducers (112, 150).

20 Claims, 2 Drawing Sheets

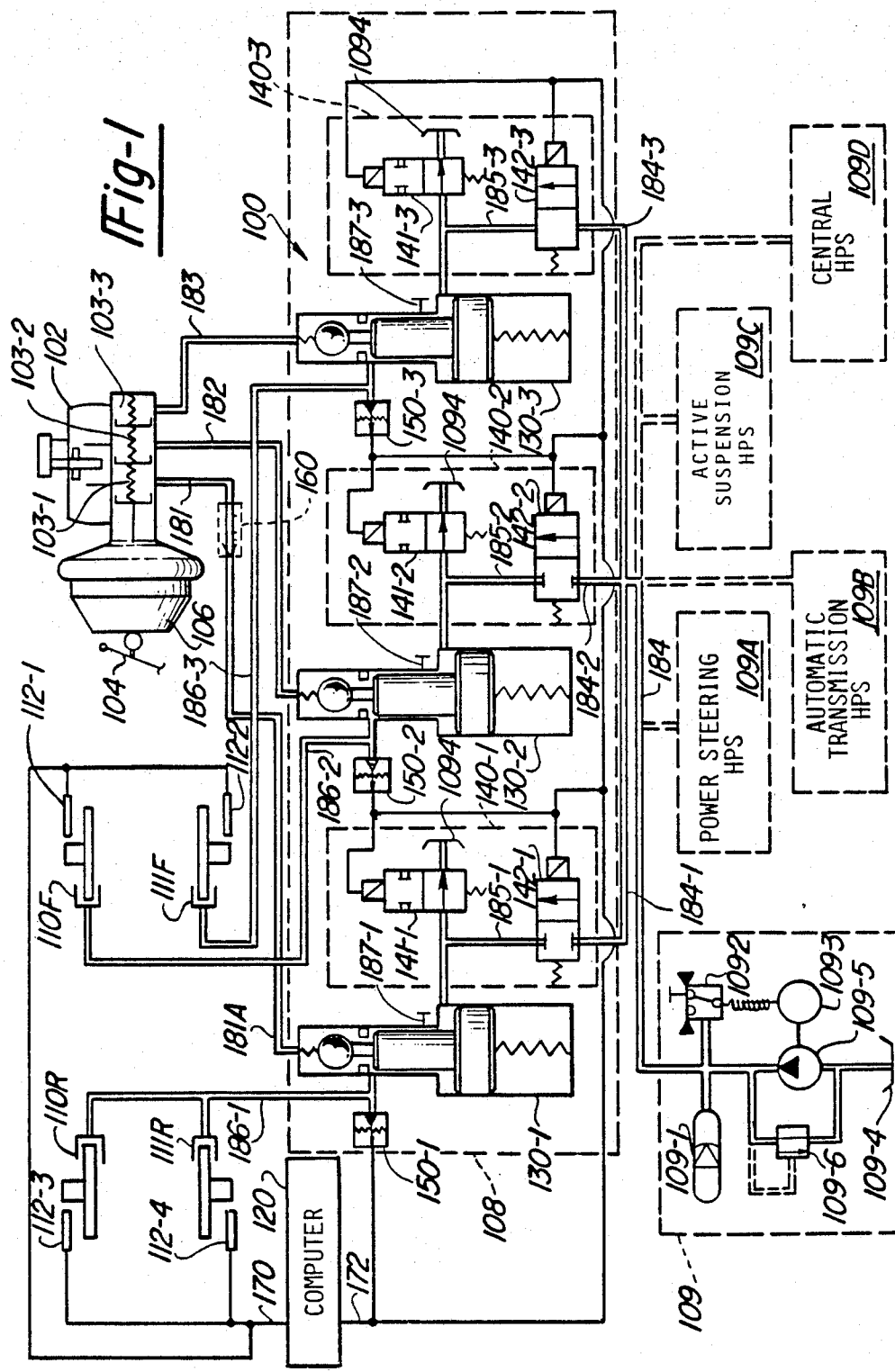

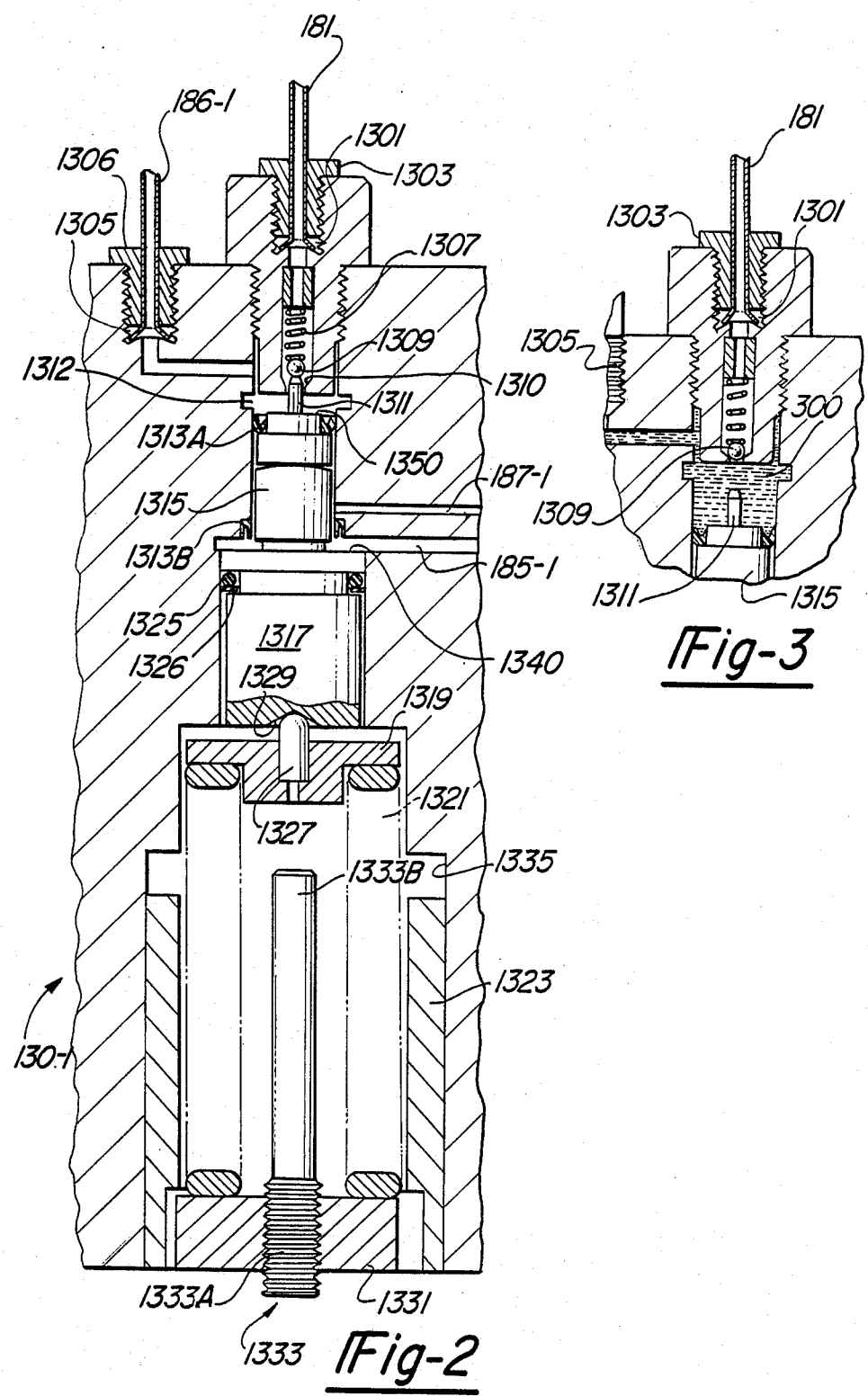

MODULATION ARRANGEMENT FOR ANTI-LOCK BRAKE SYSTEM

BACKGROUND OF THE INVENTION

The invention relates generally to anti-lock braking systems. More particularly, the invention concerns proportional control of brake fluid pressure modulation in anti-skid braking systems.

Automatically controlled anti-skid braking systems (ABS) traditionally have sought to attain three goals. The first goal of an ABS is to avoid front wheel lockup. Under such a condition, one loses "steerability." the second goal of a typical ABS is to avoid "fish-tailing" or rear-end instability. The third goal of an ABS is to minimize the stopping distance. It has been found that the stopping distance of the vehicle may be made shorter if the wheels are operated at low slip rather than in a fully locked or skid condition (the effective coefficient of friction is greater at lower slip than at full slip).

The typical ABS attempts to optimize stopping distance, steerability, and rear-end stability during so-called "panic stops." In a typical ABS method, one desires a high brake torque "apply" rate for quick response. Additionally, one needs a high "release" rate, if the condition of lockup is sensed as about to begin. The conditions of "apply," "hold," and "release" refer respectively to increase, constant and decreasing brake pressure or resulting brake torque. The apply state means brake torque is being increased, the release state means that brake torque is being decreased, while the hold state indicates that the brake is being maintained constant.

The typical ABS system now utilizes a control computer in conjunction with wheel speed sensors and a stored program ABS algorithm to effect the attainment of the above three goals. One such anti-skid braking control method is disclosed in a copending application to Douglas E. Bernard entitled Anti-Skid Braking System Control Method which is assigned to the same assignee as this invention.

Regardless of the ABS control method employed, the hardware for effecting the apply, hold or release braking commands, i.e., the modulation arrangement for the anti-lock brake system, obviously becomes a key element of any ABS system.

Such hardware approaches to effecting brake pressure modulation are discussed in an article entitled "Hydraulic Brake Actuation Systems Under Consideration of Anti-Lock Systems and Disc Brakes" by Depenheuer and Strien, paper number 730535 presented at the National Automobile Engineering Meeting, Detroit, Mich., May, 1973. A more detailed arrangement is presented in a paper by Schurr and Dittner entitled "A New Anti-Skid Brake System for Disc and Drum Brakes," paper number 840468 presented at the International Congress and Exposition, Detroit, Mich., February, 1984.

SUMMARY OF THE INVENTION

It is an object of the invention to provide an improved brake pressure modulation arrangement for use with an anti-lock braking system.

The invention contemplates an arrangement for modulating brake fluid pressure having a modulation valve assembly coupled to the output lines of a master cylinder of the vehicle being controlled. The modulation valve assembly is, in turn, coupled to the brakes associated with the vehicle wheels. A hydraulic power supply which may be separate from the brake fluid power supply is coupled to the modulation assembly for supplying hydraulic fluid thereto. A control computer is coupled to a plurality of wheel speed sensors which are associated with each wheel having a brake. The computer is additionally coupled to the modulation assembly for providing modulation control signals thereto. Additionally, via a pressure transducer associated with each modulation assembly, the control computer monitors the brake fluid pressure being supplied to each of the vehicle wheels. The modulation assembly includes a combined isolation valve/displacement cylinder which incorporates a stepped piston driven by the hydraulic power supply against a biasing spring to provide for a brake pressure release function, while at the same time closing off the supply of brake fluid coming from the master cylinder and isolating the brake fluid from the hydraulic fluid used in the hydraulic power supply. The pressure transducer allows monitoring the brake pressure for use by the control computer, in turn enabling a use of a simpler control algorithm with less diagnostics.

It is a feature of the invention that it allows use of existing hydraulic power supplies which may already be present in the vehicle, thereby eliminating the added cost of this component.

It is a further feature of this invention that it allows use of petroleum-based fluids in the high pressure, closed loop hydraulic system used to control the modulator valve assembly.

It is still a further feature of the invention that the arrangement of the displacement cylinder enables use of a wide range of pressures in the closed loop hydraulic control system.

BRIEF DESCRIPTION OF THE DRAWING

These and other objects and features of the invention will become apparent from a reading of a detailed description of a preferred embodiment, taken in conjunction with the drawing in which:

FIG. 1 is a functional schematic diagram of an ABS system incorporating a modulator arrangement of the invention;

FIG. 2 is a cross-sectional view of one of the combined isolation valve/displacement cylinders of FIG. 1; and FIG. 3 is a partial view of the combined isolation valve/displacement cylinder of FIG. 2 showing the piston of the displacement cylinder in its activated condition.

DETAILED DESCRIPTION

An ABS system arranged in accordance with the principles of the invention is set forth in the diagram of FIG. 1. ABS 100 functions with a brake actuator or pedal 104 of the vehicle, which is coupled to an existing master cylinder 102 via a conventional vacuum assist unit 106. The ABS of FIG. 1 is specifically set up in the disclosed embodiment to function with a so-called FFR wheel brake arrangement, wherein the two rare brakes 110R and 111R are served by a common brake fluid line and wherein the front wheel brakes 110F and 111F are each served by separate brake fluid lines. However, it is to be understood that the arrangement contemplated by the invention is also applicable to other wheel brake arrangements, such as a diagonal arrangement wherein the left front and right rear wheels are served by a common brake fluid line, with the right front and left rear wheels served by another line. The invention is likewise applicable to a conventional split wherein two brake lines respectively serve a pair of rear wheels and a pair of front wheels. Indeed, the invention could be used in a system wherein each wheel has its own dedicated brake fluid line.

Master cylinder 102 includes three separate spring-loaded brake fluid pistons 103-1, 103-2 and 103-3 supplying brake fluid to output lines 181, 182 and 183. Output line 181, which is associated with the two rear wheel brakes, may optionally include a proportional valve 160 which essentially serves as a back-up unit to the ABS by allowing the brake pressure associated with the rear brakes to build up to some predetermined level, for example, 500 pounds per square inch, and then to reduce the output rate to inhibit further pressure increase rates at the rare brakes to prevent lockup. Such an optional proportional valve may not be necessary with the presence of an ABS but, rather, as mentioned above, would serve as a backup to the ABS.

Output lines 181, 182 and 183 are coupled to an ABS valve module 108 which includes a plurality of modulator assemblies equal in number to the brake fluid output lines emanating from the master cylinder 102. Each modulator assembly is comprised of a combined isolation valve/displacement cylinder 130, a pressure transducer 150 and a control valve assembly 140. Output line 181 is coupled to an input port of combined isolation valve/displacement cylinder (IVDC) 130-1, output line 182 is coupled to an input port of IVDC 130-2, and output line 183 is coupled to an input port of IVDC 130-3. Braking fluid is supplied from IVDC 130-1 to rear brakes 110R and 111R via line 186-1 which is coupled to an output port of IVDC 130-1 and an input to pressure transducer 150-1. Brake fluid line 186-2 supplies brake fluid to front wheel brake 110F. Line 186-2 is coupled to an output port of IVDC 130-2 and to an input of pressure transducer 150-2. In a similar manner, brake fluid is supplied to front brake 111F via line 186-3 which is coupled to an output port of IVDC 130-3 and an input to pressure transducer 150-3.

IVDC 130-1 is controlled by a control valve assembly 140-1 which comprises a normally open, two-way, high response solenoid valve 141-1 coupled between fluid reservoir 1094 and a control port of IVDC 130-1 via line 185-1. Line 185-1 is additionally coupled to normally closed, two-way, high response solenoid valve 142-1 which is, in turn, coupled via line 184-1 and line 184 to hydraulic power supply system 109.

In a similar manner, IVDC 130-2 is controlled by control valve assembly 140-2 and IVDC is controlled by control valve assembly 140-3, each arranged identically to control valve assembly 140-1, as described above. Control valve assemblies 140-2 and 140-3 are respectively coupled to hydraulic line 184 via lines 184-2 and 184-3.

Each IVDC includes a venting port 187 which is in communication with the cylinder of the IVDC and is located between two sealing rings which will be discussed in more detail below in conjunction with FIG. 2. As seen from FIG. 1, IVDC 130-1 has a venting port 187-1, IVDC 130-2 has a venting port 187-2 while IVDC 130-3 has a venting port 187-3.

Control computer 120 is electrically coupled via bus 170 to wheel speed sensors 112-1, 112-2, 112-3 and 112-4 which are respectively associated with wheels served by brakes 110F, 111F, 110R and 111R. Computer 120 is additionally electrically coupled to ABS valve module 108 via bus 172, as shown, both for receipt of pressure indicating signals from transducers 150-1, 150-2 and 150-3 and for transmission of modulation control signals to the solenoid valves of control valve assemblies 140-1, 140-2 and 140-3.

Hydraulic power system 109 is an integrated system which would be provided as a dedicated part of the ABS arrangement set forth in the remainder of FIG. 1. Alternatively, the optional power supplies shown as 109A, B, C and D could be connected to hydraulic line 184 for supplying the requisite hydraulic power to the ABS.

Hydraulic power system 109 comprises an accumulator 109-1 and a dual access switch 109-2 both coupled to hydraulic line 184. Hydraulic line 184 is additionally coupled to a pump 109-5 and a relief valve 109-6, which is in turn coupled to reservoir 109-4. Pump 109-5 is driven by motor 109-3 which is additionally coupled to dual access switch 109-2.

Alternatively, an existing hydraulic power source of the vehicle could be utilized for driving the control valve assemblies of ABS valve module 108 via hydraulic line 184. The optionally connectable hydraulic power supplies are shown as 109A, which for example could comprise the power steering hydraulic power supply of the vehicle; supply 109B, which could comprise the automatic transmission hydraulic power supply of the vehicle; supply 109C which could comprise the active suspension hydraulic power supply of the vehicle; or supply 109D which could comprise a central hydraulic power supply serving all hydraulically controlled systems of the vehicle.

IVDC 130-1 of FIG. 1 is set forth in more structural detail in FIG. 2. As seen from FIG. 2, hydraulic line 181 from master cylinder 102 (FIG.1) is coupled to an input port 1301 of IVDC 130-1, for example, by a threaded connection which is furnished in a coupling member or nut 1303.

Output hydraulic line 186-1 is coupled to an output port 1305 of IVDC 130-1 via, for example, nut 1306. The input and output ports both lead to a first cylinder bore region in IVDC 130-1 designated 1312. The input port communicates with region 1312 via an isolation or check valve comprised of a valve ball 1309, a valve biasing spring 1307 and a valve seat 1310. The isolation check valve is held open by a protuberance 1311 extending from a displacement piston portion 1315 which is slidably received in the cylinder bore of region 1312. Piston portion 1315 is surrounded by two sealing rings 1313A and 1313B, seal 1313A surrounding piston portion 1315 at an end carrying protuberance 1311, while sealing ring 1313B surrounds piston portion 1315 adjacent control port 185-1. A venting port 187-1 communicates with the smaller cylinder bore 1312 at a point mediate the sealing rings 1313A and 1313B.

The small displacement portion 1315 of the stepped piston is joined to a larger or power portion 1317 of the stepped piston. At the junction of the small and large portions of the piston, control line 185-1 communicates with the cylinder bore. Sealing O-ring 1325 and back-up ring 1326 surround the larger piston portion 1317. The other end of the piston portion 1317 includes a conical cavity 1329 for receipt of a bearing protrusion 1327 which is captured in a spring retaining section 1319. Retainers 1319 and 1331 maintain the position of a spring 1321. Rigidly threadedly connected to the cylinder housing is an adjustable stop 1333 having an adjustment end 1333A and a stop end 1333B.

A cylindrical annular cavity 1335 houses a cylindrical adjustable spring 1323 which is used to adjust the preload on the spring 1321, for purposes to be set forth below.

With reference to FIGS. 1, 2 and 3, the operation of the modulator arrangement will now be described. As seen from the description of the structure of the arrangement set forth above, the anti-lock brake system contemplated by the invention utilizes a control computer 120, wheel speed sensors 112 and hydraulic control 108 to limit wheel slip and optimize control and braking. Computer 120 modulates control valve assemblies 140 to reduce brake pressure during impending lock and to maintain braking at an optimum level on the μ-slip curve.

When the vehicle operator applies pressure to the brake pedal 104, brake fluid flows under pressure supplied by master cylinder pistons 103-1, 103-2 and 103-3 via lines 181, 182 and 183, respectively, to the input ports of the IVDCs, such as input port 1301 of IVDC 130-1 (FIG. 2.). As long as the brake fluid pressure in IVDC cylinder bore region 1312 exerted against the small end 1350 of piston portion 1315 is below a given pressure determined by the preload of biasing spring 1321, the IVDC piston will not move, and brake fluid will flow under pressure out of output port 1305 to the associated brakes via line 186-1.

Computer 120 monitors brake pressure and wheel speed via buses 172 and 170, respectively. When, in accordance with its programmed control algorithm and monitored inputs, computer 120 determines that wheel lock-up is about to occur, computer 120 sends a release command via bus 172 to appropriate solenoid valves, such as 141-1 and 142-1 to respectively close and open. Under this state, valve 142-1 will allow hydraulic fluid from power supply 109 to enter control port 185-1 to exert pressure on face 1340 of power piston portion 1317 sufficient to displace piston 1317 in a downward direction, as viewed in FIG. 2, to overcome the preload of biasing spring 1321. The piston will continue such downward motion until retainer 1319 comes into contact with adjustable stop 1333 at its stop end 1333B or until the required brake pressure is attained. Such a downward direction of the piston pulls the protuberance 1311 out of contact with ball 1309 thereby enabling the check valve to close the input port under pressure of bias spring 1307. The cavity 1312 will become enlarged due to motion of the piston, and, as seen in FIG. 3, brake fluid 300 can drain from the wheel brakes back through output port 1305 into the enlarged cavity 1312. The result is a release of brake pressure in a rapid manner.

When, in accordance with a preprogrammed control method, computer 120 determines that brake pressure should be reapplied during the anti-lock braking command sequence, appropriate signals are given by computer 120 via bus 172 to the control valve assemblies which provide for a return flow path to reservoir 1094 of the hydraulic control fluid back out of control port 185-1. Withdrawal of the hydraulic fluid enables the piston to be returned to its normal position under the force of the coil die spring 1321. This return motion will force the brake fluid back out of the cavity 1312 to the associated wheel brake to reapply brake pressure.

By using high response solenoid valves 141 and 142 together with a combined isolation valve displacement cylinder 130, proportional control of braking can be obtained. It is to be noted that while in a specific embodiment set forth the control valve 140 shown is combined of two, two-way, high response solenoid valves, one could likewise use a single three-way solenoid, a three-way proportional control valve or a three-way flow or pressure control servo valve with equivalent results.

By use of the special seals 1313A and 1313B in IVDC 130, and a vented chamber between them, use of any fluid in the closed loop hydraulic control system is possible. This includes any of the hydraulic power systems already on the vehicle.

By varying the area 1340 of the large section of the piston 1317 of the IVDC, a power system of any pressure can be used.

The control valve assembly 140 reduces and reapplies brake pressure by controlling flow of hydraulic fluid to the control port 185 of the IVDC which is an unequal area piston actuator working against a spring 1321 as described above. Spring preload is set via adjusting spring 1323 to prevent motion of the piston within the IVDC until master cylinder pressure applied to the input port at the small end 1315 of the displacement piston exceeds a preselected level or until hydraulic fluid is fed into the cylinder via the control port. The spring preload can be varied using adjustable spring 1323 to fit the system requirements for any vehicle.

The pressure transducers 150 associated with each IVDC 130 allow monitoring brake pressure by the control computer 120 for use in the control algorithm. Such a pressure transducer may be used for closing a pressure control loop and storing the cap-off pressure at which the isolation ball valve is closed. This should allow for a simpler control algorithm with less diagnostics and will also enable a decreased control loop update time thereby providing a more responsive anti-lock braking system.

A totally isolated power system for an ABS allows use of a wide variety of fluids for powering the modulator assembly. Seals such as 1313A and 1313B are best selected to be compatible with both brake fluid and petroleum-based fluids. Teflon, plastic and some elastomeric compounds are examples of seals that could be used. The seal and vented space arrangement between them allows using virtually any hydraulic power supply for powering the ABS system even though the hydraulic fluid used therein is petroleum based.

The modulation arrangement disclosed also enables use of any proportional control valve to optimize braking. The control valve assembly shown in FIG. 1 utilizes two, two-way high response solenoid valves suitable for control by pulse width modulation. The high response solenoid valves allow higher response control systems for more efficient braking. The normally closed valves 142 provide a secondary function of blocking off hydraulic fluid supply during the period of the duty cycle during which the braking and/or ABS is not being used. This provides a large power saving.

The invention has been described with reference to a detailed description of a preferred embodiment. The details disclosed are given for the sake of example only and the invention is to be defined in scope and spirit by the appended claims.

What is claimed is:

1. In an anti-lock brake system for a brake having master cylinder means coupled to brake actuation means, and braking means associated with preselected wheels of the vehicle, an arrangement for modulating brake fluid pressure at the braking means comprising:

modulation valve means coupled to the master cylinder means for receipt of brake fluid therefrom and coupled to the braking means for delivery of brake fluid thereto;

hydraulic power supply means coupled to the modulation valve means for supplying hydraulic fluid thereto;

wheel speed sensor means associated with the preselected wheel;

computer means coupled to the wheel speed sensor means and to the modulation valve means for providing modulation control signals to the modulation valve means; and pressure transducer means coupled to the modulation valve means and to the computer means, operative to provide the computer means with a signal indicative of brake fluid pressure delivered to the braking means by the modulation valve means;

wherein the modulation valve means includes means for altering brake fluid pressure presented to the braking means in response to receipt of hydraulic fluid from the hydraulic supply means and means for isolating the brake fluid from the hydraulic fluid and wherein the means for altering brake fluid pressure comprises:

a stepped cylinder having a first cylinder bore section of a first diameter coupled to a second cylinder bore section having a second diameter, an input port in an end of the first section coupled for receipt of brake fluid from the master cylinder means, an output port extending from a wall of the first section coupled for delivery of brake fluid to the braking means, and a control port extending from a junction of the first and second cylinder bore sections, a stepped piston having a first portion slidably received in the first cylinder bore section and a second portion slidably received in the second cylinder bore section, biasing means coupled between the second portion of the stepped piston and an end of the second cylinder bore, check valve means in the first cylinder bore section adjacent the input port operative, whenever the stepped piston moves away from the input port, to prevent brake fluid flow into the input port, and control valve means coupled between the control port and the hydraulic power supply means and electrically coupled to the computer means, the control valve means operative upon receipt of a first modulation control signal from the computer means to direct hydraulic fluid into the control port thereby driving the stepped piston away from the input port and against the biasing means and further operative upon receipt of a second modulation control signal to provide a return path for the hydraulic fluid back out of the control port to enable the piston to move toward the input port under control of the biasing means.

2. The arrangement of claim 1 wherein the means for isolating the brake fluid from the hydraulic fluid comprises sealing means surrounding the first portion of the stepped piston between the control port and an end of the piston nearest the output port.

3. The arrangement of claim 2 wherein the sealing means comprises a first sealing ring surrounding the first portion of the stepped piston adjacent the control port and a second sealing ring surrounding the first portion of the stepped portion adjacent the end of the piston nearest the output port and wherein a venting port communicates with the first cylinder bore section at a location between the first and second sealing rings.

4. The arrangement of claim 3 wherein the first and second sealing rings are fashioned from a material compatible with both brake fluids and petroleum-based fluids.

5. The arrangement of claim 3 wherein the first and second sealing rings are fashioned from plastic.

6. The arrangement of claim 1 wherein the pressure transducer means is coupled to the output port of the stepped cylinder.

7. The arrangement of claim 1 wherein the control valve means comprises a normally closed, two-way solenoid valve coupled between the hydraulic power supply means and the control port and a normally open, two-way solenoid valve coupled between a hydraulic fluid reservoir and the control port.

8. The arrangement of claim 1 wherein the hydraulic fluid is different from the brake fluid.

9. The arrangement of claim 1 wherein the hydraulic power supply means is used for other vehicle system purposes in addition to the anti-lock brake system.

10. In an anti-lock brake system for a vehicle having master cylinder means with a plurality of brake fluid output lines, each output line associated with at least one wheel brake of the vehicle, an arrangement for modulating brake fluid pressure at each wheel brake comprising:

a plurality of modulator assemblies, each assembly coupled to one of the brake fluid output lines and to the wheel brake associated with the output line for delivery of brake fluid thereto;

hydraulic power supply means coupled to each of the modulator assemblies for supplying hydraulic fluid thereto;

wheel speed sensor means associated with each vehicle served by a wheel brake; and computer means coupled to each wheel speed sensor means and to each modulator assembly for providing modulation control signals to each modulator assembly;

wherein each modulator assembly comprises a cylinder having a first bore section having a first diameter communicating with a second bore section with a second diameter larger than the first diameter, a piston having a displacement portion slidably received in the first bore section and a power portion slidably received in the second bore section, a biasing spring coupled to the power portion for maintaining the piston at an idle position within the cylinder, an input port at an end of the first bore section coupled to a corresponding brake fluid output line, a spring-loaded ball valve in the inlet port urged toward a closed position by the loading spring, the displacement portion of the piston including a protrusion bearing against the ball valve such that the ball valve is in the open position whenever the piston is in the idel position, an output port extending from a wall of the first bore section coupled for delivery of brake fluid to an associated wheel brake, a control port extending from the second bore section adjacent a junction of the first and second bore sections, control valve means coupled between the control port and the hydraulic power supply means and electrically coupled to the computer means, the control valve means operative upon receipt of a first modulation control signal from the computer means to direct hydraulic fluid into the control port to drive the piston away from the input port and against the biasing spring such that the protrusion of the displacement portion of the piston no longer bears against the ball valve, thereby enabling the ball valve to close the input port and enabling brake fluid to flow back into the cylinder via the output port, the control valve means operative upon receipt of a second modulation control signal from the computer means to provide a return path enabling the hydraulic fluid to flow back out of the control port to enable the piston to return to its idle position under control of the biasing spring, first and second sealing rings surrounding the displacement portion of the piston between the protrusion and the control port operative to isolate the brake fluid from the hydraulic fluid, and a venting port communicating with the first bore section at a location between the first and second sealing rings; and a pressure transducer in fluid communication with the output port and electrically coupled to the computer means, operative to provide the computer means with a signal indicative of brake fluid pressure delivered to the wheel brake by the modulator assembly.

11. The arrangement of claim 10 wherein the control valve means comprises a normally-closed, two-way, high response solenoid valve coupled between the hydraulic power supply means and the control port and a normally-open, two-way, high response solenoid valve coupled between a hydraulic fluid reservoir and the control port.

12. The arrangement of claim 10 wherein the hydraulic fluid is different from the brake fluid.

13. The arrangement of claim 12 wherein the first and second sealing rings are fashioned from a material compatible with both brake fluids and petroleum-based fluids.

14. The arrangement of claim 13 wherein the first and second sealing rings are fashioned from plastic.

15. The arrangement of claim 10 further comprising an adjustable stop fixed to a housing for the cylinder and extending into the second bore section of the cylinder for a preselected distance, the stop operative as positioned to limit the travel of the piston away from its idle position.

16. The arrangement of claim 10 further comprising means for adjusting preload on the biasing spring.

17. The arrangement of claim 10 wherein the vehicle has two front and two rear wheels and associated brakes and the master cylinder means has a first brake fluid output line and a first modulator assembly associated with the two rear wheel brakes, and second and third brake fluid output lines and second and third modulator assemblies respectively associated with the first and second front wheel brakes.

18. The arrangement of claim 10 wherein the vehicle has two front and two rear wheels and associated brakes and wherein the master cylinder has a first brake fluid output line and a first modulator assembly associated with the two rear wheel brakes, and a second fluid output line and a second modulator assembly associated with the two front wheel brakes.

19. The arrangement of claim 10 wherein the vehicle has two front and two rear wheels and associated brakes and wherein the master cylinder has a first brake fluid output line and a first modulator assembly associated with one of the front wheel brakes and one of the rear wheel brakes, and a second brake fluid output line and a second modulator assembly associated with the other one of the front wheel brakes and the other one of the rear wheel brakes.

20. The arrangement of claim 10 wherein a separate brake fluid output line and a modulator assembly are associated with each wheel of the vehicle.

* * * * *